(No Model.)
J. SCHMID.
ICE VELOCIPEDE.
No. 504,625. Patented Sept. 5, 1893.
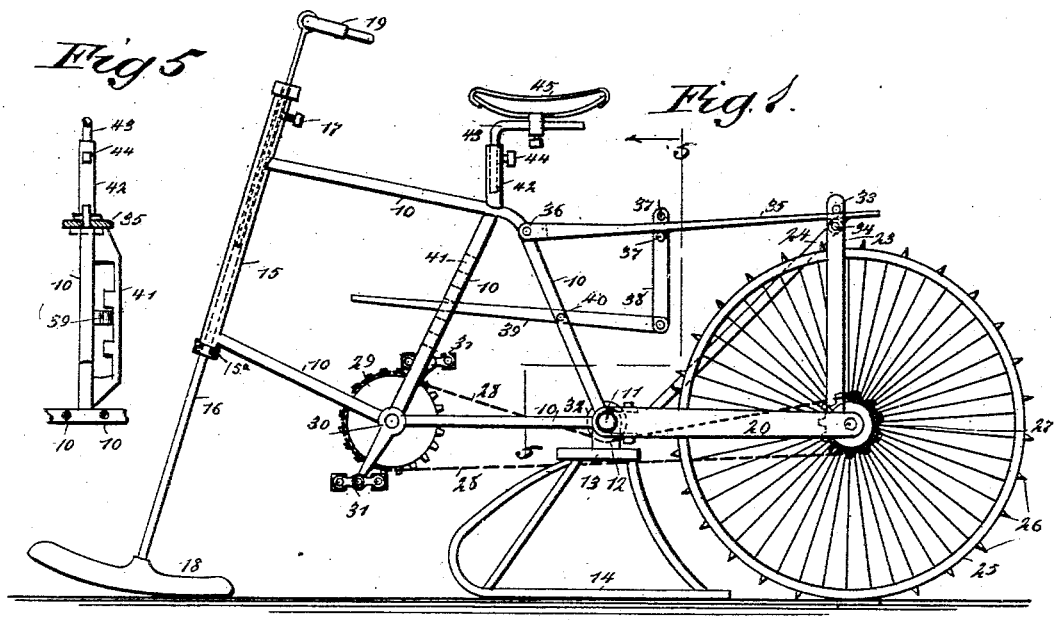
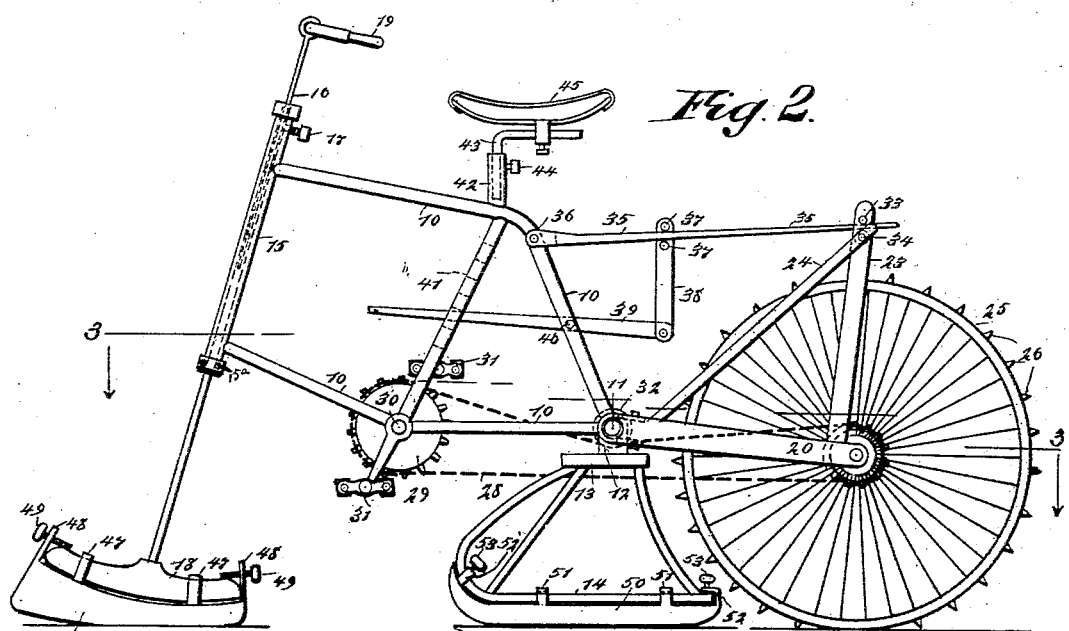
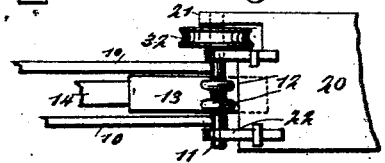
WITNESSES:
INVENTOR
J. Schmid
BY
Munn & Co
ATTORNEYS.

UNITED STATES PATENT OFFICE.

JONAS SCHMID, OF MILL CREEK, PENNSYLVANIA.

ICE-VELOCIPEDE.

SPECIFICATION forming part of Letters Patent No. 504,625, dated September 5, 1893.

Application filed March 3, 1893. Serial No. 464,512. (No model.)

*To all whom it may concern:*

Be it known that I, JONAS SCHMID, of Mill Creek, in the county of Erie and State of Pennsylvania, have invented a new and Improved Ice-Velocipede, of which the following is a full, clear, and exact description.

My invention relates to improvements in that class of velocipedes which are provided with shoes or runners and are adapted to be driven over snow or ice; and the object of my invention is to produce an extremely compact, light, cheap and strong vehicle of this class, which resembles an ordinary safety bicycle and is driven in the same way, which is adapted for use on either snow or ice, which may be conveniently steered, which has its driving wheel adjustable vertically, so as to bring it into the right position in relation to the snow or ice upon which it is driven, and which may be very easily and rapidly driven and perfectly controlled.

To this end my invention consists in certain features of construction and combinations of parts, as will be hereinafter described and claimed.

Reference is to be had to the accompanying drawings forming a part of this specification, in which similar figures of reference indicate corresponding parts in all the views.

Figure 1 is a side elevation of the machine embodying my invention, as adapted for use on snow. Fig. 2 is a similar view, but with the machine adapted for use on ice. Fig. 3 is a sectional plan on the line 3—3 in Fig. 2. Fig. 4 is an enlarged detail plan of the joint connecting the main frame with the driving wheel frame; and Fig. 5 is a vertical section on the line 5—5 in Fig. 1.

The machine is provided with a main frame 10, shaped substantially like a common safety bicycle, and this frame is preferably made of tubular material to give it the necessary lightness. The rear end of the frame terminates in an axle or shaft 11 on which are pivoted the bearing blocks 12, which are secured to the top 13 of the runner 14, which runner aligns with the driving wheel, as hereinafter described. The front end of the frame terminates in a sleeve 15, substantially like that of an ordinary bicycle, the sleeve being mounted in a ball bearing 15ª, and extending longitudinally through this sleeve is the steering post or rod 16. The steering rod is made in two parts, the upper part fitting into the lower as shown by dotted lines in Figs. 1 and 2, and the two parts are held together by a set screw 17 which projects through a slot in the sleeve. At the lower end of the steering rod is a curved runner 18, and at the upper end of the rod is the usual handle bar 19 by means of which it and the runner may be turned and the machine steered. The curved shape of this runner 18 enables it to be easily turned.

The driving wheel is carried in a vertically swinging frame which is essentially a bell crank and which has a fork 20, the front end of which is hinged to an axle 11, the fork having on one side an extension 21 which is secured to the axle and having on the opposite side a staple 22 which also embraces the axle. Extending upward from the rear end of the fork and from both members are rods 23, and these project above the driving wheel and are connected by braces 24 with the front portion of the fork 20.

The driving wheel 25 is constructed like an ordinary bicycle wheel, except that it has a thin steel rim on which are projecting teeth 26 adapted to stick into the snow or ice so that the wheel may get a good grip thereon and drive the machine forward. On one side of the wheel 25 is the usual sprocket wheel 27, which is driven by a chain 28 connecting with a driving sprocket wheel 29 on the crank shaft 30, this being journaled in the lower portion of the frame 10 and having the usual crank pedals 31 for turning it. The chain 28 is adapted to extend beneath a guide pulley 32 which is journaled on the axle 11, as shown best in Fig. 4.

At the upper ends of the rods or posts 23 are transverse pins 33 and 34, between which extends a stiff flat spring 35, and this spring extends forward and is pivoted at its front end to the upper portion of the frame 10, as shown at 36 in Figs. 1 and 2. Near the center the spring 35 is clasped by pins 37 on a depending link 38, the lower end of which is pivoted to a lever 39 which is fulcrumed, as shown at 40, on the back part of the frame 10, and the forward end of this lever extends opposite a rack bar 41 which is arranged in a nearly vertical position on the frame and the teeth of which are adapted to engage the lever 39 and hold it at any desired height. By moving the lever up and down, the spring 35 may be raised or lowered so as to tilt the frame of the driving wheel 25, and the height of the wheel, in relation to the rest of the machine, may thus be regulated.

On the top of the frame 10, and near its rear end, is an upwardly extending post 42 which is hollow and in which is held the bent rod 43 on which the saddle 45 is carried, this arrangement being substantially like that in the type of safety bicycle. The rod 43 is held at the necessary height by a set screw 44.

The runners 14 and 18 are adapted for use on snow, but when the machine is to be used on ice, sharper runners or skates are used, the forward runners 18 being provided with a skate or shoe 46 which has upwardly extending lugs 47 which embrace the sides of the runner 18, and which has flanges 48 at its ends which are adapted to press against the end of the runner. Extending through these flanges are screws 49 which overlap and bear upon the top end portions of the runner, and the lugs 47 prevent any side movement of the shoe or skate. The flanges 48 prevent end movement of the same, and the screws 49 bind it to the runner 18 so that it cannot work loose.

The rear shoe 14 is adapted to be fitted with a skate or shoe 50, substantially like the skate or shoe 46 described above, and the skate 50 is provided with side lugs 51 to embrace the runner, with end lugs 52 which are bent upward and inward so as to extend over the top of the runner, and with thumb screws 53 which extend downward through the lugs and impinge upon the runner, thus binding the skate or shoe in place.

The machine is propelled by simply turning the crank shaft 30 by means of the pedals 31, and the chain 28 is turned by means of the sprocket wheel 29 so that the driving wheel 25 is revolved, and this propels the machine forward. To steer the machine, it is only necessary to turn the handle bar 19 in the usual way, and the runner 18 will thus be turned and the rear runner 14 and driving wheel 25 will follow the steering runner. If the machine is to be propelled on ice, the shoes or skates 46 and 50 are applied in the manner specified.

By means of the lever 39 the swinging frame may be adjusted so as to bring the driving wheel into the right position to cause its teeth to strike effectively upon the snow or ice, and as previously described, the lever may be fastened in the rack 41 so as to hold the driving wheel in the necessary position.

Having thus described my invention, I claim as new and desire to secure by Letters Patent—

1. An ice velocipede, comprising a frame having a seat thereon, a steering rod journaled in the front portion of the frame and having a runner at its lower end, a runner hinged to the rear of the frame and adapted to follow the steering runner, a wheel frame hinged to the rear portion of the main frame and projecting rearwardly therefrom, a toothed driving wheel mounted in the said frame, a pedal operated mechanism for operating the wheel, and a lever mechanism for adjusting the driving wheel and holding it in yielding contact with the ice or snow, substantially as described.

2. An ice velocipede, comprising a main frame, a steering rod journaled in the main frame and having a curved runner at its lower end, a second runner hinged to the rear end of the frame and adapted to follow the steering runner, a vertically swinging frame hinged to the rear end of the main frame, a toothed driving wheel journaled in the swinging frame, pedal-operated mechanism for turning the driving wheel, a spring connecting the upper end of the swinging frame with the upper portion of the main frame, a lever fulcrumed on the main frame and pivotally connected with the central portion of the spring, and mechanism for fastening the lever in a fixed position, substantially as described.

3. In an ice velocipede, the combination with the main frame, of a wheel frame hinged to the main frame, and provided with upwardly extending posts at its rear end, a spring pivoted to the main frame and having a loose connection with the posts of the wheel frame, a pivoted lever, a link pivoted to the lever and loosely connected to the spring, and a wheel mounted in the said frame, substantially as described.

4. In an ice velocipede, the combination with the runners, of detachable skates, each provided with end lugs or flanges to embrace the runners, and screws passing through the lugs or flanges and engaging the runners, substantially as described.

JONAS SCHMID.

Witnesses:
D. W. HUTCHINSON,
ALBERT GERLACH.